(12) United States Patent
Takamaru et al.

(10) Patent No.: US 7,160,502 B2
(45) Date of Patent: Jan. 9, 2007

(54) METHOD FOR PRODUCING ANODE FOR RECHARGEABLE BATTERY

(75) Inventors: Kiyofumi Takamaru, Kobe (JP); Hideaki Ikeda, Kakogawa (JP); Koji Tatsumi, Chigasaki (JP)

(73) Assignee: Santoku Corporation, Hyogo (JP)

( * ) Notice: Subject to any disclaimer, the term of this patent is extended or adjusted under 35 U.S.C. 154(b) by 416 days.

(21) Appl. No.: 10/479,884

(22) PCT Filed: Apr. 9, 2002

(86) PCT No.: PCT/JP02/03532

§ 371 (c)(1),
(2), (4) Date: Dec. 4, 2003

(87) PCT Pub. No.: WO02/101855

PCT Pub. Date: Dec. 19, 2002

(65) Prior Publication Data

US 2004/0217327 A1    Nov. 4, 2004

(30) Foreign Application Priority Data

Jun. 11, 2001   (JP) ............................. 2001-175124

(51) Int. Cl.
*C22C 1/05* (2006.01)
*B22F 1/00* (2006.01)
(52) U.S. Cl. ............................ 419/66; 419/61; 419/62; 419/65

(58) Field of Classification Search .................... None
See application file for complete search history.

(56) References Cited

U.S. PATENT DOCUMENTS

| 5,470,404 A | * | 11/1995 | Yamamoto et al. | ......... 148/426 |
| 5,674,327 A | * | 10/1997 | Yamamoto et al. | ......... 148/302 |
| 2004/0159377 A1 | * | 8/2004 | Takamaru et al. | .......... 148/513 |

FOREIGN PATENT DOCUMENTS

| EP | 0 570 957 A2 * | 5/1993 |
| JP | 08-138659 A1 | 5/1996 |
| JP | 11-121009 A1 | 4/1999 |
| JP | 2001-040442 A1 | 2/2001 |

* cited by examiner

*Primary Examiner*—John P. Sheehan
(74) *Attorney, Agent, or Firm*—Darby & Darby

(57) ABSTRACT

The present invention relates to a method for readily producing an anode for rechargeable batteries having conflicting properties in good balance, including the corrosion resistance and the activities such as the initial activity and the high rate discharge performance, and having excellent recyclability. The method includes the steps of mixing and molding anode materials containing an electrically conductive material and at least two kinds of $AB_5$ type hydrogen storage alloys, wherein said alloys have substantially single phase structures and the same composition, wherein each of the alloys have an average crystal long axis diameter of 30 to 350 μm, and wherein the alloys have different ratios (D1/D2) of the average crystal long axis diameter (D1) to the average short axis diameter (D2).

3 Claims, No Drawings

METHOD FOR PRODUCING ANODE FOR RECHARGEABLE BATTERY

FIELD OF ART

The present invention relates to methods for producing an anode for rechargeable batteries, in particular, to methods for readily producing an anode for rechargeable batteries having corrosion resistance and activities, such as initial activity and high rate discharge performance, in good balance.

BACKGROUND ART $AB_5$ type hydrogen storage alloys have been the predominant materials for anodes of rechargeable batteries. For improved battery performance, the alloys are required to have various properties, such as hydrogen storage capacity, equilibrium pressure, corrosion resistance, and flatness of the plateau. Some of these properties conflict with each other, so that studies have been made for improving one property without sacrificing the other. For example, studies have been made on additional elements and compositions of the hydrogen storage alloys. However, the additional elements increase the number of constitutional elements of the alloy, which adds to the difficulties in and the cost of the battery recycling, raising new problems.

For the purpose of improving the activities of hydrogen storage alloys, which is a factor in improved activities of the batteries, there have been proposed to treat the alloy surface with acid or alkali, or to increase the content of the A-site components. However, the activities of the alloy conflict with the corrosion resistance, and these methods for improving the activities thus simultaneously impair the corrosion resistance.

In the art of metal hydride-hydrogen batteries, electrode active materials that satisfy both of these conflicting properties have been under development. To this end, there is proposed to mix an alloy excellent in corrosion resistance and an alloy excellent in activities, for preparing starting materials for the active materials. However, such alloys excellent in different properties used in this method are also different in their compositions or structures, or obtained by totally different production methods. Thus, even though the activities and the corrosion resistance are improved, the capacity and the internal pressure characteristics of the batteries are lowered, or the costs for recycling the batteries are disadvantageously increased.

DISCLOSURE OF THE INVENTION

It is therefore an object of the present invention to provide methods for readily producing an anode for rechargeable batteries that is excellent in recyclability and has both of the conflicting properties in good balance, in particular, the corrosion resistance and the activities, such as the initial activity and the high rate discharge performance, simply by employing at least two kinds of particular hydrogen storage alloys having different crystal grain sizes.

According to the present invention, there is provided a method for producing an anode for rechargeable batteries comprising the steps of mixing and molding anode materials comprising an electrically conductive material and at least two kinds of $AB_5$ type hydrogen storage alloys, wherein said at least two kinds of $AB_5$ type hydrogen storage alloys have substantially single phase structures and a same composition, wherein each of said alloys have an average crystal long axis diameter of 30 to 350 μm, and wherein said alloys have different ratios (D1/D2) of an average crystal long axis diameter (D1) to an average crystal short axis diameter (D2).

According to the present invention, there is also provided a method for producing an anode for rechargeable batteries comprising the steps of mixing and molding anode materials comprising an electrically conductive material and anode active materials at least comprising:

$AB_5$ type hydrogen storage alloy (1) having substantially a single phase structure and an average crystal long axis diameter of 30 to 350 μm, wherein a ratio (D1/D2) of an average crystal long axis diameter (D1) to an average crystal short axis diameter (D2) is lower than 3, and $AB_5$ type hydrogen storage alloy (2) having a same composition as that of said alloy (1), substantially a single phase structure, and an average crystal long axis diameter of 30 to 350 μm, wherein a ratio (D1/D2) of an average crystal long axis diameter (D1) to an average crystal short axis diameter (D2) is not lower than 3.

PREFERRED EMBODIMENTS OF THE INVENTION

The present invention will now be explained in detail.

The methods of the present invention include the steps of mixing and molding anode materials containing an electrically conductive material and at least two kinds of $AB_5$ type hydrogen storage alloys having substantially single phase structures, the same composition, and different crystal grain sizes, i.e. different D1/D2 ratios. As used herein, the same composition means that the kinds of the compositional elements are the same. (D1) represents the average long axis diameter of the crystals, and the long axis diameter is the maximum length of a crystal along its longitudinal axis. (D2) represents the average short axis diameter of the crystals, and the short axis diameter is the average length of four lines which intersect perpendicularly with the line segment representing the long axis diameter of a crystal at the points equally dividing the line segment into five, and are limited by the grain boundary of the crystal grain.

The at least two kinds of hydrogen storage alloys used in the present invention are in the category of $AB_5$ type, all having substantially single phase structures and the same composition. Whether a hydrogen storage alloy is of a single phase structure or not may be confirmed by X-ray diffraction or under an electron microscope. Having substantially a single phase structure herein means that the presence of other phases cannot be observed clearly by these methods.

The $AB_5$ type hydrogen storage alloys used in the present invention each has the average crystal long axis diameter of 30 to 350 μm, preferably 30 to 200 μm. Combinations of at least two hydrogen storage alloys having different D1/D2 ratios may include a combination of hydrogen storage alloy (1) having the D1/D2 ratio of lower than 3, preferably not higher than 2, and hydrogen storage alloy (2) of the same composition as that of alloy (1) having the D1/D2 ratio of not lower than 3, preferably not lower than 5. Such alloy combinations may be composed of three or more kinds of alloys, and not limited to two kinds. The minimum D1/D2 ratio of hydrogen storage alloy (1) is not particularly limited, and usually 1, whereas the maximum D1/D2 ratio of hydrogen storage alloy (2) is not particularly limited, and usually 30, preferably 10.

When only hydrogen storage alloy (1) is used, or when the average crystal long axis diameter of hydrogen storage alloy (1) or (2) exceeds 350 μm, the activities required for an anode active material of rechargeable batteries may not be obtained. When only hydrogen storage alloy (2) is used, or when the average crystal long axis diameter of hydrogen storage alloy (1) or (2) is less than 30 μm, the desired corrosion resistance is hard to be obtained.

The mixing ratio of the hydrogen storage alloys (1) and (2) as the anode active materials may suitably be decided, and the ratio of hydrogen storage alloy (1) to hydrogen storage alloy (2) by weight is preferably 99:1 to 50:50, more preferably 95:5 to 80:20. When the mixing ratio of hydrogen storage alloy (2) to hydrogen storage alloy (1) is too low, sufficient improvement in initial activity may not be achieved, and when too high, sufficient improvement in corrosion resistance may not be achieved.

In the present invention, the compositions of the $AB_5$ type hydrogen storage alloys are not particularly limited, as long as the alloys fall under the $AB_5$ type and provide hydrogen storage capability. For example, the hydrogen storage alloys may have a composition represented by the formula (1):

$$RNi_xM_y \quad (1)$$

wherein R stands for one or a mixture of rare earth elements including yttrium, M stands for Co, Mg, Al, Mn, Fe, Cu, Zr, Ti, Mo, W, B, or a mixture thereof, x satisfies $3.3 \leq x \leq 5.3$ and y satisfies $0.1 \leq y \leq 1.5$, with $4.7 \leq x+y \leq 5.5$.

In the above formula, R may preferably be, for example, one or more members selected from the group consisting of La, Ce, Pr and Nd. In the composition of R, the content of La may preferably be large so that the resulting active material exhibits high capacity. The La content may be preferably not lower than 50%, more preferably not lower than 55%, most preferably not lower than 65%, by atomic percent. Thus the composition of R, when mainly composed of one or more members selected from the group consisting of La, Ce, Pr, and Nd, is preferably selected from 50 to 100 at % La, 0 to 50 at % Ce, 0 to 50 at % Pr, and 0 to 50 at % Nd.

In the above formula, M represents additional elements for controlling the hydrogen storage performance of the alloy. When the number of additional elements is too large, the inconveniences in recycling the resulting alloy outstrip the contribution of the additional elements to the alloy characteristics. Thus the number of additional elements is preferably 2 to 5, more preferably 2 to 3.

The hydrogen storage alloys used in the present invention may be subjected to surface coating by plating or with a high polymer, surface treatment with an acid or alkali solution, or any conventional treatment, for the purpose of further improving various properties before the alloys are processed into electrodes.

The hydrogen storage alloys used in the present invention may be prepared, for example, by melting alloy materials for preparing the alloy of the formula (1), cooling and solidifying the alloy melt into flakes of a particular average thickness, and heat-treating the flakes under particular conditions.

The average long axis diameter of the crystals of the alloy to be obtained may be controlled by regulating the cooling rate, the thickness of the flakes, or the like factors in preparing the flakes. In general, the higher the cooling rate is, the smaller the crystal long axis diameter is, and vice versa. Further, since the alloy in the form of as-cast flakes does not have a single phase structure, the alloy flakes may subsequently be heat-treated under the particular conditions for giving a single phase structure thereto. If the cooling rate in the production of alloy flakes is too low, a secondary phase of crystals appear, which grow so coarse that the alloy flakes cannot be made into a single phase structure in the subsequent heat treatment, thus not being preferred. On the other hand, if the cooling rate is too high, the crystals are made fine and readily made into a single phase structure, but the thickness of the alloy flakes is hard to be controlled within the particular range, and the productivity is lowered, thus not being preferred.

In view of the above, among the cooling conditions in producing hydrogen storage alloys (1) and (2), it is preferred to suitably select the cooling rate in preparing the alloy flakes from the range of 10 to 3000° C. per second, taking the compositions into consideration.

In producing hydrogen storage alloy (1), the thickness of the alloy flakes is usually 0.1 to 0.5 mm, preferably 0.2 to 0.3 mm. If the alloy flakes are too thick, the temperature variation in the alloy flakes is great, which results in difficulty in generating crystals of a uniform size. Too thick alloy flakes also provide enlarged reaction areas, which cause too much growth of the crystals in the subsequent long-time heat treatment. Such alloy flakes may preferably be prepared by, for example, single- or twin-roll strip casing, centrifugal casting, or rotary disk casting.

On the other hand, in producing hydrogen storage alloy (2), which has a smaller average crystal long axis diameter than that of the alloy (1), the thickness of the alloy flakes is preferably adjusted to 0.05 to 0.2 mm.

In producing hydrogen storage alloy (1), the heat treatment for giving the alloy flakes a single phase structure is performed at 950 to 1100° C. for 30 minutes to 10 hours. At lower than 950° C., it takes too much time for the crystals to grow to the predetermined crystal grain size, resulting in dispersion in crystal grain size. At higher than 1100° C., a secondary phase is reprecipitated, and the alloy of a single phase structure may not be obtained.

In producing hydrogen storage alloy (2), the heat treatment for giving the alloy flakes a single phase structure is performed at 900 to 1000° C. for 1 to 10 hours. At lower than 900° C., the single phase structure is hard to be given to the alloy flakes, and it takes time for the crystals to grow to the predetermined crystal grain size. At higher than 1000° C., the crystals may grow beyond the predetermined grain size, or dispersion may occur in the crystal grain sizes.

In the methods of the present invention, at least two kinds of $AB_5$ type hydrogen storage alloys are used as the anode active materials, which alloys have substantially single phase structures, different crystal grain sizes, and the same composition. As long as the desired advantages of the present invention are not substantially impaired, or in order to further improve such advantages, the anode active materials may optionally contain a hydrogen storage alloy of a slightly different composition. The anode active materials may also contain an alloy such as another hydrogen storage alloy that is inevitably contained.

In the methods of the present invention, the anode materials containing the above-mentioned anode active materials and an electrically conductive material are mixed and molded.

The anode materials may optionally contain other conventionally-used materials, as long as the desired advantages of the present invention are not impaired. Such other anode materials may include, for example, known binders, electrical conductivity assisting agents, and the like. The mixing and molding may be performed in conventional manners, but the anode active materials are preferably mixed in advance.

According to the methods of the present invention, since the anode materials containing the electrically conductive material and the above-mentioned at least two kinds of $AB_5$ type hydrogen storage alloys are mixed and molded, anodes for rechargeable batteries may be obtained easily, wherein the conflicting properties such as the activities and the corrosion resistance are well balanced. In addition, since the compositions of the active materials used in the methods may be made substantially the same, easily recyclable anodes for rechargeable batteries may advantageously be obtained.

EXAMPLES

The present invention will now be explained in more detail with reference to Production Examples, Examples, and Comparative Examples, but the present invention is not limited to these.

Production Examples

<Production of Alloys>

Misch metal (abbreviated as Mm hereinbelow) manufactured by Santoku Corporation (rare earth composition: 70 at % La, 22 at % Ce, 2 at % Pr, and 6 at % Nd), Ni, Co, Mn, and Al were mixed to have the composition shown in Table 1. The mixture was high-frequency melted in an alumina crucible in an argon gas atmosphere to obtain an alloy melt. The alloy melt was supplied via a tundish onto a single roll to be rapidly cooled by strip casting, thereby obtaining flakes of a hydrogen storage alloy. The alloy flakes were subjected to a heat treatment in an inert gas atmosphere. By suitably adjusting the cooling conditions of the alloy melt and the heat treatment conditions, alloys as shown in Table 2 were produced. The obtained hydrogen storage alloys were subjected to observation of the alloy structures under a scanning electron microscope, and X-ray diffraction to see whether the alloys had substantially single phase structures. Further, from the alloy structures observed under the scanning electron microscope, (D1) and (D2) were determined. The results are shown in Table 2.

TABLE 1

| Name of Alloy | Mm | Ni | Al | Co | Mn | $AB_x$ |
|---|---|---|---|---|---|---|
| A | 1 | 3.50 | 0.25 | 0.60 | 0.35 | 4.70 |
| B | 1 | 3.55 | 0.30 | 0.80 | 0.35 | 5.00 |
| C | 1 | 4.30 | 0.25 | 0.60 | 0.35 | 5.50 |
| D | 1 | 3.30 | 0.25 | 0.60 | 0.35 | 4.50 |
| E | 1 | 4.25 | 0.25 | 0.50 | 0.70 | 5.70 |

TABLE 2

| Name of Alloy | Alloy Composition | (D1) (μm) | (D2) (μm) | (D1/D2) | Single Phase or Not |
|---|---|---|---|---|---|
| A-1 | Alloy Composition | 220 | 140 | 1.57 | YES |
| A-2 | A in Table 1 | 151 | 33 | 4.58 | YES |
| A-3 | | 60 | 25 | 2.40 | NO |
| B-1 | Alloy Composition | 182 | 72 | 2.53 | YES |
| B-2 | B in Table 1 | 83 | 16 | 5.19 | YES |
| C-1 | Alloy Composition | 310 | 260 | 1.19 | YES |
| C-2 | C in Table 1 | 264 | 86 | 3.07 | YES |
| D-1 | Alloy Composition | 322 | 288 | 1.12 | NO |
| D-2 | D in Table 1 | 43 | 11 | 3.91 | NO |
| E-1 | Alloy Composition | 196 | 163 | 1.20 | NO |
| E-2 | E in Table 1 | 68 | 9 | 7.56 | NO |

Examples 1–4 and Comparative Examples 1–3

<Production of Electrodes>

Each of the hydrogen storage alloys prepared in Production Example were mechanically ground into hydrogen storage alloy powders having the average particle size of not larger than 60 μm. The alloy powders were mixed at the mixing ratio shown in Table 3 to obtain mixed powders. 1.2 g of the mixed powders, 1 g of carbonyl nickel as an electrically conductive material, and 0.2 g of fluororesin powders as a binder were mixed. The obtained mixture was wrapped with nickel mesh and pressure molded under the pressure of 2.8 ton/cm², to thereby obtain an electrode of a hydrogen storage alloy.

<Measurement of Battery Performance>

Each of the electrodes thus produced was subjected to a charge-discharge test in 30% KOH in a pressure vessel under 5 atm for evaluating the initial activity, the high rate discharge performance, and the corrosion resistance. The results are shown in Table 3.

The charge-discharge test was run for 10 cycles at the discharge current of 0.2 C to evaluate the initial activity. Subsequently, to test the high rate discharge performance, the capacity upon discharge at 1C on the 11th cycle was evaluated as the high rate discharge performance. The test was further run to test the corrosion resistance at the discharge current of 0.2 C from the 12th cycle on, and the capacity on the 500th cycle was evaluated as the corrosion resistance. The capacities were evaluated as a percentage of the capacity upon charge and discharge at 0.2 C on the 10th cycle, being 100.

TABLE 3

| | Name of Alloy | Mixing Ratio (%) | Initial Activity (%) | High Rate Discharge Performance (%) | Corrosion Resistance (%) |
|---|---|---|---|---|---|
| Example 1 | A-1 | 95 | 98.2 | 93.1 | 94.9 |
| | A-2 | 5 | | | |
| Example 2 | B-1 | 90 | 97.7 | 92.6 | 94.6 |
| | B-2 | 10 | | | |
| Example 3 | C-1 | 85 | 96.8 | 94.3 | 95.4 |
| | C-2 | 15 | | | |
| Example 4 | B-1 | 60 | 93.6 | 91.5 | 92.5 |
| | B-2 | 40 | | | |
| Comp. Ex. 1 | A-2 | 100 | 98.4 | 92.2 | 73.8 |
| Comp. Ex. 2 | D-1 | 90 | 88.3 | 82.6 | 53.6 |
| | D-2 | 10 | | | |
| Comp. Ex. 3 | A-1 | 90 | 90.1 | 89.5 | 68.2 |
| | E-2 | 10 | | | |

What is claimed is:

1. A method for producing an anode for rechargeable batteries comprising the steps of mixing and molding anode materials comprising an electrically conductive material and anode active materials at least comprising:

$AB_5$ type hydrogen storage alloy (1) having substantially a single phase structure and an average crystal long axis diameter of 30 to 350 μm, wherein a ratio (D1/D2) of an average crystal long axis diameter (D1) to an average crystal short axis diameter (D2) is lower than 3, and $AB_5$ type hydrogen storage alloy (2) having a same composition as that of said alloy (1), substantially a single phase structure, and an average crystal long axis diameter of 30 to 350 μm, wherein a ratio (D1/D2) of an average crystal long axis diameter (D1) to an average crystal short axis diameter (D2) is not lower than 3, wherein said $AB_5$ type hydrogen storage alloys have a composition represented by the formula (1):

$$RNi_xM_y \qquad (1)$$

wherein R stands for one or a mixture of rare earth elements including yttrium, M stands for Co, Mg, Al, Mn, Fe, Cu, Zr, Ti, Mo, W, B, or a mixture thereof, x satisfies $3.3 \leqq x \leqq 5.3$ and y satisfies $0.1 \leqq y \leqq 1.5$, with $4.7 \leqq x+y \leqq 5.5$.

2. The method of claim 1, wherein said (D1/D2) of the hydrogen storage alloy (1) is not higher than 2, and said (D1/D2) of the hydrogen storage alloy (2) is not lower than 5.

3. The method of claim 1, wherein a ratio of the hydrogen storage alloy (1) to the hydrogen storage alloy (2) is 99:1 to 50:50.

* * * * *